United States Patent [19]
Runyon

[11] Patent Number: 5,227,067
[45] Date of Patent: Jul. 13, 1993

[54] APPARATUS FOR IMPROVING IRRIGATION OR CLEANING WATER AND METHOD FOR ITS USE

[75] Inventor: Larry Runyon, Temecula, Calif.

[73] Assignee: Eco-Soil Systems, Inc., San Diego, Calif.

[21] Appl. No.: 782,437

[22] Filed: Oct. 25, 1991

[51] Int. Cl.$^5$ .............................................. C02F 3/02
[52] U.S. Cl. ................................ 210/606; 210/610; 210/620; 210/747; 210/143; 210/170; 210/198.1; 239/61
[58] Field of Search .............. 210/606, 610, 611, 614, 210/616, 620, 739, 747, 143, 170, 198.1, 205, 219, 242.2; 239/61, 310; 71/6, 7, 9

[56] References Cited

U.S. PATENT DOCUMENTS

| | | | |
|---|---|---|---|
| 2,382,010 | 8/1945 | Hodges | 210/610 |
| 3,431,675 | 3/1969 | Moore | 210/611 |
| 3,855,121 | 12/1974 | Gough | 210/610 |
| 3,920,552 | 11/1975 | Elkern | 210/205 |
| 4,209,388 | 6/1980 | DeFraites | 210/170 |
| 4,584,102 | 4/1986 | Bogart et al. | 210/610 |
| 4,695,384 | 9/1989 | Ripl et al. | 210/747 |
| 4,768,712 | 9/1988 | Terrell | 239/68 |
| 4,810,385 | 3/1989 | Hater et al. | 210/611 |
| 4,846,206 | 11/1989 | Peterson | 137/1 |
| 4,867,192 | 9/1989 | Terrell et al. | 239/69 |
| 4,895,303 | 1/1990 | Freyvogel | 239/68 |
| 4,925,564 | 5/1990 | Francis | 210/615 |
| 5,011,604 | 4/1991 | Wilde et al. | 210/747 |

FOREIGN PATENT DOCUMENTS 2-107389 4/1990 Japan .

OTHER PUBLICATIONS

"AG-14 The Natural Way"-10 page booklet by Natural Oxygen Products (date unknown).

"AG14 Natural Wastewater Treatment"-advertising sheet by Natural Oxygen Products (date unknown).

Primary Examiner—Wilbur Bascomb, Jr.
Assistant Examiner—Christopher Upton
Attorney, Agent, or Firm—Brown, Martin, Haller & McClain

[57] ABSTRACT

A method and apparatus are described for improving the aerobic and nutrient quality of a body of water in a reservoir which contains undesirable dissolved salts and harmful microorganisms, by incorporating into the water effective amounts of oxygen-generating microorganisms, microorganisms with an affinity for dissolved salts, and enzymes and nutrients for the microorganisms, and maintaining effective concentrations of the microorganisms, enzymes and nutrients in the water while the microorganisms convert the dissolved salts into insoluble salts which precipitate and to remove or deactivate the harmful microorganisms. The apparatus includes supply tanks containing water slurries of the microorganisms, enzymes and nutrients, conduits to convey supply water, slurries, enzymes and nutrients into the water, an optional spray to aerate some slurry as it sprays onto the surface of the water; and pumps in the conduits to maintain such effective concentrations of the microorganisms, enzymes and nutrients in the water. The system may be controlled by a computer. Typical of the applications for which this invention can be used is the rejuvenation and enhancement of irrigation water supplies for golf course and parks and well as waterusing businesses such as car washes. When used for parks and golf courses, one of the desirable results is the enhancement of growth and physical condition of the vegetation of the course or park. In both the golf course/park situation and the car wash situation, the use of this invention allows the more efficient use of cleaning and/or fertilizing materials with resultant improvement in the cost-effectiveness of operation of the facility.

16 Claims, 1 Drawing Sheet

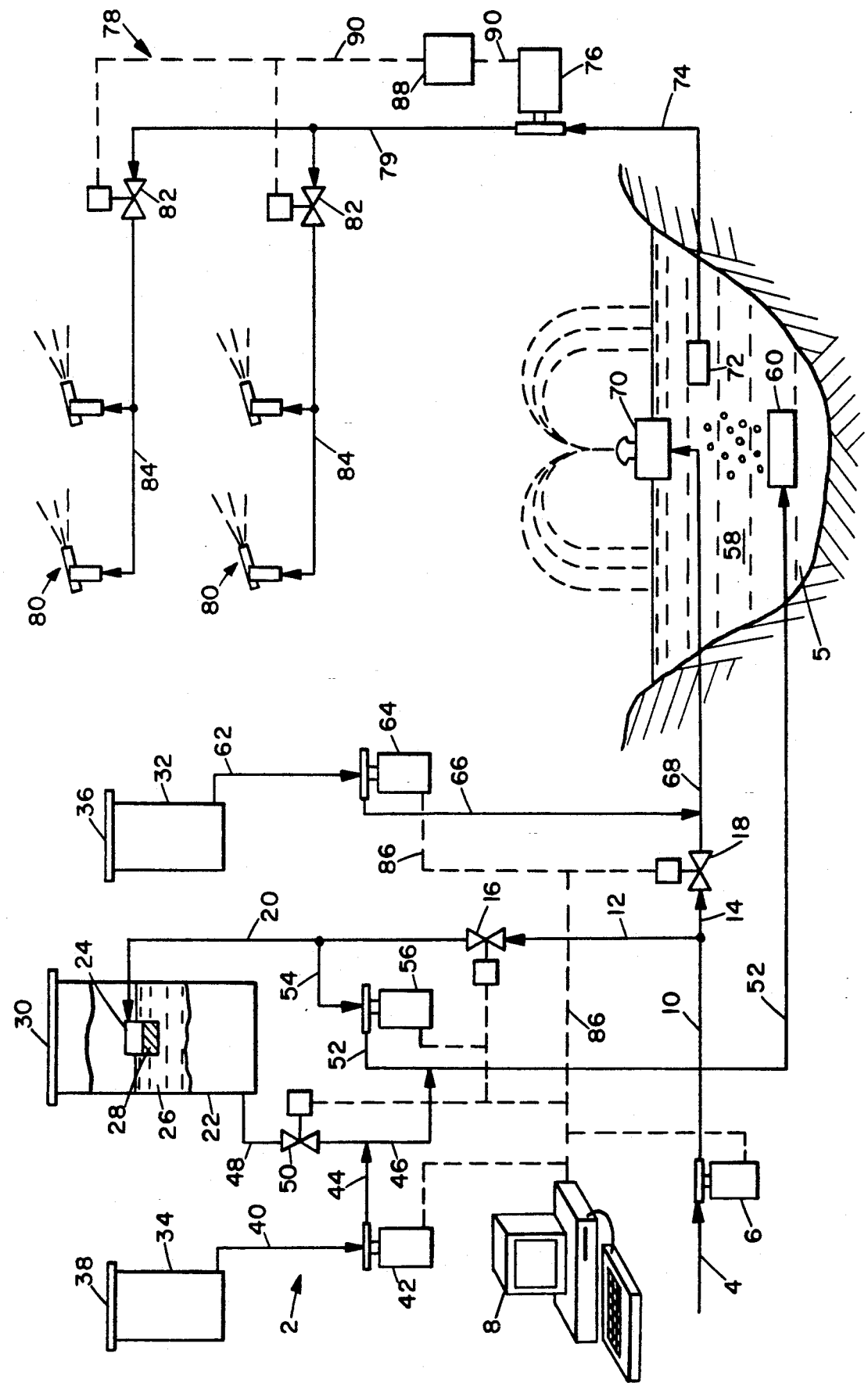

5,227,067

APPARATUS FOR IMPROVING IRRIGATION OR CLEANING WATER AND METHOD FOR ITS USE

BACKGROUND OF THE INVENTION

1. Field of the Invention

This invention relates to methods and apparatus for enhancing water quality. More particularly, it relates to methods and apparatus for improving the water quality in an enclosed pond or reservoir.

2. Description of the Prior Art

In the past it has commonly been the practice in many cases to manage golf course and park horticulture by what is known as the "sterile field" technique. It is well known that soils contain a wide variety of microorganisms of different types, some of which are beneficial to the plants and grass and others of which are harmful; see Grey et al., eds., *The Ecology of Soil Bacteria*, (University of Toronto Press: 1968). Since the various mixtures of microorganisms in the different soils are highly complex and vary widely from soil to soil and region to region, it has become common in golf course and park maintenance to apply biocidal materials to sterilize the soil by killing all of the bacteria and other microorganisms, including both harmful and beneficial species. Thereafter, once the biocidal activity has dissipated, the park or golf course manager applies fertilizers, nutrients and beneficial microorganisms to the soil and to some extend maintains an ongoing replenishment of these materials to attempt to keep the soil, grass and other shrubbery of the park or golf course in the desired good condition.

This type of soil management, even though believed generally beneficial, actually causes several problems, some of which are only now beginning to become evident. First, it forces the soil and local vegetation to become dependent upon the application of the chemicals and organisms by the maintenance personnel. In many cases the soil managers do not or cannot know the optimum nutrient and biological requirements of the local soil and vegetation, and therefore the chemical and microorganism materials provided do not supply the optimum nutrition and growth potential to the vegetation.

Further, it has been found that there are a number of soil and vegetation diseases which proliferate only in the sterile soil environment, so much effort must be expended to combat the incursion of these diseases.

There are also many microorganisms in soil which are neither exclusively harmful nor beneficial, but rather play a mixed roll depending on the type of soil and vegetation involved. Thus eliminating all naturally-occurring microorganisms and concentrating solely on the artificial application of "helpful" organisms often leaves the soil and vegetation deprived of the "mixed effect" organisms.

Further, in open areas it is impossible to prevent the re-incorporation into the soil of many of the naturally-occurring organisms which were removed by the sterile field technique initially. Consequently, the golf course or park manager must periodically again sterilize the soil and restart the nutrient supply process.

In addition, in almost all areas of the country incoming water contains dissolved salts, especially sodium salts, which pass through the irrigation system and are deposited onto the soil. The incorporation of such salts into the soil causes the soil to become less porous and receptive to irrigation (more "closed"), and to cause more water to run off and less to be taken up into the soil, such that continuously increasing quantities of irrigation water must be put onto the soil to accomplish satisfactory irrigation of the vegetation. One aspect of this is a particular problem in the arid parts of the United States, such as the West and Southwest, where water is scarce and costly and must be used as efficiently as possible. A converse aspect of the increased need for water to irrigate the closed soils is a particular problem in the wet parts of the United States, such as the South and East, where the excess run-off from poorly utilized irrigation water often poses serious soil erosion problems. In all parts of the country the excess run-off also carries away fertilizes and nutrients which are laid but do not penetrate the soil, resulting in economic waste and loss to the park or golf course owner and pollution of the catch basins and water courses where the run-off ends up.

In park and golf course maintenance, irrigation is a separate operation from fertilizer, nutrient and (where used) microorganism supply. The latter is normally conducted by manual broadcast or deposition on the soil of solid granulated fertilizers or bacterial materials, or such products are dissolved in water to make concentrated solutions or slurries which are manually sprayed onto the soil and vegetation. These operations are labor intensive, time consuming and put course and park workers in prolonged contact with large quantities of chemicals, so that they must be provided with protective clothing and equipment; all of these factors make such maintenance costly. Consequently, in practice it will be found that fertilizers and bacterial materials are only infrequently applied; that the manual applications are usually non-uniform, with numerous areas of the park or course receiving too little or too much material; that resupply of fertilizers and nutrients is performed too infrequently and intermittently to maintain a satisfactory level of viable microorganisms in the soil; and that workers may be at risk of harm when they neglect or refuse to wear and use the protective clothing and equipment furnished to them.

Further, as noted above, such broadcast and deposit methods, and also the spray methods where the soil is at least partially closed, results in fertilizers, nutrients and microorganisms which are merely laid on the surface of the soil. These do not penetrate into the soil and are susceptible to being washed away by irrigation water and rainfall, and in either case do not reach the target vegetation.

The net result of these considerations is that the parks and golf course vegetation does not get the frequent, regular, and optimum nutrition that is needed to produce and maintain healthy, lush and attractive vegetation and to result in a cost effective and economically viable golf course or park operation.

In golf course and park land irrigation, there is commonly a relatively large water supply reservoir (such as a pond or lake) from which water is drawn during each day for irrigation and which is replenished as needed, often every night. Over the course of time the content of harmful salts and organisms increases in the water and these materials deposit on the reservoir sides and bottom so that periodically the reservoir much be drained and cleaned, so the water when used will not transfer those harmful organisms and contaminants to the soil or vegetation of the golf courses or parks. In addition, the bottom portion of the water (often extending upward some distance) tends to become depleted in oxygen by various mechanisms. Consequently, this region of oxygen depletion also tends to accumulate anaerobic microorganisms, many of which are harmful to soil and vegetation. Commonly water treatment plants deal with these problems by circulating the water and aerating it. However, in the golf course and park operations, there is usually not sufficient water retention time to provide adequate aeration and water turnover as one finds in commercial water treatment plants. Consequently, when the water is subsequently pumped out of the ponds for the golf course or park irrigation, it usually carries with it some amount of various dissolved salts and anaerobic organisms which are carried to the water irrigation intake by circulation within the pond. The subsequent deposition of these salts and microorganisms is of course detrimental to the soil and vegetation.

It would therefore be useful to have a system whereby such reservoirs could be continually cleaned of salts and harmful bacteria (such as anaerobes) and maintained with various beneficial microorganisms, such that the irrigation water being drawn from them would be or approach optimum for the irrigation of the soil and vegetation.

SUMMARY OF THE INVENTION

The invention herein includes a method and apparatus for improving the aerobic and nutrient quality of a body of water in a reservoir, which body of water contains undesirable dissolved salts and harmful microorganisms. In its method aspects, the invention comprises incorporating into the body of water effective amounts of oxygen-generating first microorganisms, second microorganisms with an affinity for dissolved salts, enzymes and nutrients for the first and second microorganisms, and maintaining effective concentrations of the first and second microorganisms, enzymes and nutrients in the body of water for a period sufficient to enable the first and second microorganisms to substantially convert the dissolved salts into insoluble salts which precipitate from the body of water and to remove or deactivate the harmful microorganisms.

In its apparatus aspects, the invention comprises a first supply tank containing a water slurry of an oxygen-generating first microorganism; a second supply tank containing a water slurry of a second microorganism which has an affinity for dissolved salts; a third supply tank containing a water slurry of enzymes and nutrients for the first and second microorganisms; a first conduit to convey supply water, the first slurry and the enzymes and nutrients into the body of water; a second conduit to convey supply water and the second slurry to an aeration device adapted to aerate the slurry prior to incorporating it into the body of water; and at least one pump incorporated into each of the first and second conduits to maintain effective concentrations of the first and second microorganisms, enzymes and nutrients in the body of water for a period sufficient to enable the first and second microorganisms to substantially convert the dissolved salts into insoluble salts which precipitate from the body of water and to remove or deactivate the harmful microorganisms.

Typical of the applications for which this invention can be used is the rejuvenation and enhancement of irrigation water supplies for golf course and parks and well as water-using businesses such as car washes. When used for parks and golf courses, one of the desirable results is the enhancement of growth and physical condition of the vegetation of the course or park. In both the golf course/park situation and the car wash situation, the use of this invention allows the more efficient use of cleaning and/or fertilizing materials with resultant improvement in the cost-effectiveness of operation of the facility.

BRIEF DESCRIPTION OF THE DRAWINGS

The single Figure of the drawings is a schematic representation of a golf course or park irrigation system embodying the method and apparatus of the present invention.

DETAILED DESCRIPTION AND PREFERRED EMBODIMENTS

The process and apparatus of the present invention allow the rejuvenation of stagnant, anaerobic supply ponds and lakes for golf course and park irrigation and also provide means for dispersing soil adjuvants to the soil and vegetation of the park or golf course in a regular, uniform and frequent manner, such that normal ecological balance of microorganisms and other soil materials is maintained and the soil need not be sterilized in order to maintain a healthy, attractive and flourishing soil and vegetation system for the golf course or park.

The system is best initially understood by reference to the single Figure of the drawings, which is a schematic diagram illustrating the various components of the system (the system being generally designated 2). Water from a conventional water source (not shown) enters the system through supply line 4. The water supply will be from the normal sources for golf course and parks, commonly municipal water supplies, which may either be potable water or "gray water" recycled from municipal sewage after some limited sewage treatment. Such water supply is normally provided under ordinary municipal pipeline pressures, although if desired the water can be pumped from a supplemental holding tank or pond (not shown) to line 4, if municipal water pressure is inadequate or if direct access to the municipal supply is not possible. (Other water enters pond/reservoir 5 from rain, snow and natural run-off from the course or parkland.) The flow of the input water in line 4 to the system is controlled by pump 6.

Pump 6 supplies water through line 10 to lines 12 and 14, which contain valves 16 and 18, respectively. Water in line 12 passed through valve 16 and line 20 into tank 22 (shown partially in cut-away), which is the main supply tank for the soil enhancing microorganisms (to be described below). In a typical golf course system tank 22 has a 110 gallon (420 liter) capacity. Within tank 22 is a floating control valve 24 which maintains the level of bacteria-containing slurry 26 at a desired point. Suspended in a porous container 28 below the valve 24 is a soluble block of microorganisms, which slowly dissolves to maintain a generally uniform concentration of microorganisms in the slurry 26. Tank 22 has a removable top 30 so that the tank can be serviced as needed.

Two other tanks (labeled 32 and 34) are used in the system. Both are batch tanks, rather than continuous tanks as is tank 22. In a typical golf course system tanks 32 and 34 each may have a 55 gallon (210 liter) capacity, although tank 34 is often smaller. Tank 32 holds a supply of water slurry which contains oxygen-supplying microorganisms. This slurry is normally obtained commercially in slurry form or can be externally mixed, and tank 32 is periodically refilled as needed through removable top 36. Similarly, tank 34 holds a supply of water slurry which contains enzymes and nutrients for the microorganisms in tanks 22 and 32; the enzymes and nutrients can be contained in the same slurry since they are compatible. As with the slurry in tank 32, the slurry in tank 34 is normally obtained commercially in slurry form or may be mixed externally, and tank 34 is periodically refilled as needed through removable top 38.

Tank 34 discharges its enzyme/nutrient slurry through line 40 by means of pump 42 through line 44 to a junction with line 46. Line 46 also receives microbial slurry from tank 22 through discharge line 48 which is controlled by valve 50. Line 46 in turn discharges into line 52, which contains fresh water drawn from line 20 through line 54 be means of pump 56. Line 52 continues into pond 2 and discharges its combined streams into the pond water 58 directly from the end of the pipe forming line 52 or through a conventional discharge device 60, such as a sparger.

Tank 32 discharges its microbial slurry through line 62 by means of pump 64 into line 66, which in turn discharges into line 68 which is downstream from valve 18, and in which it can be combined with fresh water when valve 18 is open. The water/slurry passes through line 68 to floating spray (or fountain) device 70 which sprays the water/slurry into the air to aerate the microorganisms it before it falls onto the surface of pond 2 and merges into the water supply 58, thus enhancing its oxygen content.

Thereafter, when desired and normally on a predetermined schedule, water 58 is pumped out of pond 2 through irrigation inlet 72 and line 74 by pump 76 and into distribution system 78 through line 79 where it flows to various groups of sprinklers 80. The flow to each separate group is controlled by valves 82 in distribution lines 84.

The feed system 2 is controlled overall by computer 8, which is programmed to direct the opening and closing of valves 16, 18 and 50 and operation of pumps 6, 42, 54 and 64, as indicated by the dotted lines 86 in the schematic Figure. A computer 88 similarly controls distribution system 78 by means of valves 82 and pump 76 as indicated by dotted lines 90. The computers 8 and 88 may be different devices, located in the same or different locations, or the same computer may handle both functions.

The computer 8 will be programmed to operate the system 2 such that the desired quantities and concentrations of the two groups of microorganisms (from tanks 22 and 32) and the enzymes and nutrients (from tank 34) are provided to the pond water 58. The precise amounts of each material, the time of supply to the pond 2, and the order in which each is supplied will be determined by a number of factors, including the type of park or course vegetation and soil, the volume of the pond 2, the specific microorganisms, enzymes and nutrients being used, and the time of year. Park and golf course supervisors and others skilled in the art of park and course maintenance will have no difficulty determining the appropriate schedule of operation for each specific park or course at any time of the year with no more than minimal experimentation.

Similarly, computer 88 is programmed to run distribution system according to the irrigation requirements of the specific course or park, including such factors as the type of vegetation and soil, the drainage and exposure of the different parts of the course or park, and the time of year. While such distribution systems are frequently already run by computer programs which incorporate such factors, those supervisors and others skilled in the art are likely to find that their current distribution programs need to be reconsidered when using the feed system 2 of this invention, since after an initial use period of several weeks or months, the growth and health of the vegetation and the quality of the soil will have so significantly improved that the irrigation schedule can be revised and optimized.

There are two types of bacteria used in the feed system 2. Those microorganisms from tank 32 which are aerated through the surface spray system 70 will include the oxygen-providing soil-enhancing bacteria while supplied through the make-up water line 68 from tank 22 will include will include the salt-reducing anti-anaerobic bacteria.

The exact mechanism of operation of the system is not known, since the materials used contain many different strains and genera of microorganisms. It is believed, however, that certain of the various microorganisms supplied from tanks 22 and 32 serve to destroy and eliminate the anaerobic bacteria which would otherwise accumulate in the pond water 58 and thereafter to prevent any substantial buildup of such anaerobes, and that certain other microorganisms supplied from tanks 22 and 32 have an affinity for dissolved salts, especially sodium salts, acting on such salts in the pond water and causing a significant quantity of those salts to be converted to insoluble salts and precipitated in the pond, so that they are not drawn out with the irrigation water and distributed onto the soil and vegetation. The presence of the enzymes and nutrients is critical, since the irrigation system is used daily and the microorganisms distributed to the soil and vegetation through the distribution system 78 must be constantly fed in order for them to provide the ongoing and increasing enhancement of the soil and vegetation which this system produces. If the enzymes and nutrients are not constantly provided as part of the regular operation of the system, then the microorganisms will quickly die and the unsatisfactory conditions of the prior art techniques will prevail.

It has been found that in typical cases, a badly degraded irrigation pond of conventional size for a standard eighteen-hole golf course can be rejuvenated in a period of about 2–4 months of daily application of the system of this invention. Simultaneously, the use of the improved and bacterial-material enhanced water on the course vegetation within the same period produces substantially enhanced vegetation, with improved root systems, better coverage, substantial elimination of "sterile soil" diseases, and (in the case of grass) improved resistance to the normal abuse of golf swings, golf carts and golf shoes. Thereafter maintenance of the improved turf, shrubbery, trees and other vegetation and soil becomes routine. It is usually found that the maintenance quantities of the microorganisms, nutrients and nutrients will be somewhat less than the quantities needed initially to correct the sterile soil and poor pond conditions. However, the correct quantities for each course or park at any given level of improvement or maintenance will be readily determined by the supervisors or other skilled course workers.

The various materials which are useful herein are commonly mixtures of a variety of microorganisms, and frequently are commercially sold as proprietary combinations. However, those skilled in the art will be able to determine appropriate materials by selecting those which provide the functions of oxygen-supply and salt affinity.

The microorganisms which will be designated "soil enhancing" and which are contained in tank 22 are exemplified by a microbial product commercially available under the trade name "Bac-Terra" ® from Fifco International, Inc. of Del Mar, Calif. This is a proprietary material described as containing nitrifying bacteria, thermophilic bacteria and oxygenating bacteria. Microorganisms which it is believed will be satisfactory as the material in tank 22 are those which include thermophiles as archaebacteria, described in Brock et al., *Biology of Microorganisms* (5th edn., 1988) §18.6; microorganisms which utilize hydro-carbons as nutrients, such as pseudomonas and mycobaccterium (Brock et al., §16.23); nitrogen fixating bacteria such as *azotobacter spp. cyanobacteria* and *bacillus polymyxa* (Brock et al., §16.24); and halophiles such as halobacterium (Brock et al., §19.33). Those microorganisms useful as the bacteria supplied from tank 32 are exemplified by a microorganism product commercially available under the trade name "AG-14" from Natural Oxygen Products of El Paso, Tex., and described in U.S. Pat. No. 3,855,121. Similar products which it is believed will be equivalent to the "AG-14" material include pseudomonas, flavobacterium, *bacillus polymyxa* and *bacillus sphaericus*, described respectively at Brock et al., §§19.15, 19.20, and 19.26 (the two *Bacillus spp.*), as well as *euglina spp.*, described in Moore et al., *Biological Science* (1963), pp. 248-249. Various known microbial nutrients and enzymes can be supplied from tank 34. These are exemplified by a product commercially available under the trade name "BNB-931" from Westbridge Company of Carlsbad, Calif., and a chelated product commercially available under the trade name "Sun-Up"; in this product the chelating agent is citric acid.

It is not known with certainty why the materials used in this invention are so effective. It is believed, however, that to some extent it involves the formation of polysaccharides as by-products of the growth of the beneficial microorganisms in the soil. The polysaccharides complex with humus and organic matter and enhance the ability of the soil particles to aggregate. The aggregation of the soil improves the soil porosity and permits an increase in average soil temperature, to facilitate capture, retention and growth of water, microorganisms and nutrients. Acidity of the soil may also be decreased.

There are a number of typical tests which can be used to monitor the improvements which occur in soils to which the microbial products are administered in accordance with this invention. These include Ph analysis, soild nutrient analysis, temperature monitoring, odor testing and microbial population plate counts.

As an example of the present invention, a combination of the "Bac-Terra", "AG-14" and "BNB-931" products were applied to a water supply pond on a golf course in Southern California and, after thorough mixing and residence in the pond, were applied to a test section of the course. The well water source, pond, soil and vegetation on the course were examined both before and after the utilization of this invention for sodium chloride and bicarbonate content (reported respectively as Na, Cl and "BiC"), over a seven week application period. Total Na/Cl/Bic of the well water during this period increased by about 6%. However, the treatment of the pond reduced the Na/Cl/Bic by almost 22%, indicating that the harmful materials were being removed from the pond water. The soil on various test greens showed results indicative of strong removal of Na and Cl (BiC was not tested in the soil) from greens which were previously in reasonably good condition, and significant steps toward leach removal of Na and Cl from greens which had recently been reconstructed. It is believed that the latter green will match the performance of the better greens as treatment continues for several more weeks. Examination of Na content of the vegetation of the greens, both those previously in relatively good condition, and those recently reconstructed, showed results similar to that of the soil, with the progress toward complete vegetation rejuvenation faster than with the soil (Cl and BiC were not tested in the vegetation). Clearly continued application of the materials applied in accordance with the present invention can return badly abused golf courses, parks and the like and their irrigation supply water sources and ponds to healthy and productive states in a matter of only a few months, and thereafter maintain them in that desirable condition.

While the above system has been described in terms of golf courses and parks, it will be evident that it has application and utility in other areas where enhancement and improvement of water quality in a reservoir is desired. For instance, in commercial car washes it is found that the recycled wash water picks up microorganisms and dissolved salts from the cars being washed and from the drainage surfaces of the car wash facility. Even though most car washes employ filters to removed much of the dirt washed off the cars, many of these materials manage to pass through the filters and are then sprayed back onto subsequent cars that come through. This can cause damage to the cars' finishes, and in any case reduces the efficiency of the detergent used in the car wash, since the detergent must wash off not only the dirt initially on a car but also the excess materials re-deposited on the car from the water spray itself. This results in the need for greater-than-optimum quantities of both wash water and detergent, which in turn results in economic loss to the wash owner and potential contamination by water discarded into the sewer systems. Consequently the same type of system of this invention useful for golf courses and parks will be useful for businesses such as car washes. The slight variation in the types of microorganisms needed will be readily determined, since of course the function of vegetation enhancement is not needed in the car wash operation; rather emphasis will be on removal of dissolved salts and harmful microorganisms.

It will be apparent that there are numerous embodiments of this invention which, while not expressly described above, are clearly within the scope and spirit of the invention. Therefore the above description is to be considered exemplary only, and the actual scope of the invention is to be limited solely by the appended claims.

I claim:

1. Apparatus for improving the aerobic and nutrient quality of a body of water in a reservoir, which body of water contains undesirable dissolved salts and harmful microorganisms, which comprises:
   a first supply tank containing a water slurry of an oxygen-generating first microorganism;
   a second supply tank containing a water slurry of a second microorganism which has an affinity for dissolved salts;

a third supply tank containing a water slurry of enzymes and nutrient for said first and second microorganisms;

first conduit means for conveying supply water, said first slurry and said enzymes and nutrients into said body of water;

second conduit means for conveying supply water and said second slurry to an aeration device adapted to aerate and slurry prior to incorporating said slurry into said body of water; and at least one pump means incorporated into each of said first and second conduit means for continuously maintaining effective concentrations of said first and second microorganisms, enzymes and nutrients in said body of water for a period sufficient to enable said first and second microorganisms to substantially convert said dissolved salts into insoluble salts which precipitate from said body of water and to remove or deactivate said harmful microorganisms.

2. Apparatus as in claim 1 further comprising control means for regulating the operation of each of said means to regulate the flow of said slurries and said supply water in said conduits.

3. Apparatus as in claim 2 wherein said control means comprises a programmable computer operably connected to an activation and speed controller on each said pump, and operating software acted on by said computer to determine the time and speed or operation of each said pump according to a predetermined measure of the desired effective level of said first and second microorganisms, enzymes and nutrients to be maintained in said body of water.

4. Apparatus as in claim 3 wherein each of said conduit means has incorporated therein valve means controlled by said programmable computer and software to further regulate the flow of said slurries in said conduits.

5. Apparatus an in claim 2 wherein each of said conduit means has incorporated therein valve means controlled by said control means to further regulate the flow of said slurries in said conduits.

6. Apparatus as in claim 1 further comprising means for extracting treated water from said body of water and dispersing said treated water at a remote location.

7. Apparatus as in claim 6 wherein said location is at least a portion of a golf course or park and said dispersing is conducted by forcing said treated water through at least one spray device directing spray onto said portion of said golf course or park.

8. Apparatus as in claim 6 wherein said location is at least a portion of a car washing facility and said dispersing is conducted by forcing said treated water through at least one spray device and directed as vehicles to be washed.

9. Apparatus as in claim 1 wherein said first tank comprises a chamber for said water slurry, a connection with a source of supply water and regulating means for permitting sufficient supply water to enter said chamber to maintain a generally constant volume of liquid in said chamber as slurry is withdrawn from said chamber and passed to said body of water.

10. Apparatus as in claim 9 wherein said first tank also contains means for retaining a solid soluble mass of said first microorganisms, which mass dissolves at a given rate and meters said first microorganisms into said liquid to form said slurry.

11. Apparatus as in claim 1 wherein said aeration device comprises sprayer means for causing said supply water and said slurry to be sprayed into the air and to fall onto the surface of said body of water.

12. Apparatus as in claim 11 wherein said sprayer means floats on the surface of said body of water.

13. A method of improving the aerobic and nutrient quality of a body of water in a reservoir, which body of water contains undesirable dissolved salts and harmful microorganisms, which comprises incorporating into said body of water effective amounts of oxygen-generating first microorganisms, second microorganisms with an affinity for dissolved salts, enzymes and nutrients for said first and second microorganisms, and continuously maintaining effective concentrations of said first and second microorganisms, enzymes and nutrients in said body of water for a period sufficient to enable said first and second microorganisms to substantially convert said dissolved salts into insoluble salts which precipitate from said body of water and to remove or deactivate said harmful microorganisms.

14. A method as in claim 13 further comprising applying water from the improved body of water to vegetation to enhance growth and physical condition of said vegetation.

15. A method as in claim 14 wherein said vegetation is in a park or golf course.

16. A method as in claim 13 wherein said dissolved salts are sodium salts.

* * * * *